3,187,010
POLYHALO-4,7-ENDOMETHYLENE-3a,4,7,7a-
TETRAHYDROPHTHALIDES
Alfred A. Levin, Skokie, and Sidney B. Richter, Chicago, Ill., assignors to Velsicol Chemical Corporation, Chicago, Ill., a corporation of Illinois
No Drawing. Filed Sept. 10, 1962, Ser. No. 222,677
9 Claims. (Cl. 260—343.3)

This invention relates to new insecticidally active compositions of matter. In particular this invention relates to compounds having the following structural formula:

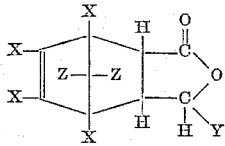

wherein each X is independently selected from the group consisting of bromine and chlorine; each Z is independently selected from the group consisting of chlorine, bromine and hydrogen; and Y is a halogen atom.

It has now been found that compounds having the foregoing structure have unexpectedly superior insecticidal activity against a broad spectrum of insects and mites. This activity is of extensive value since it permits a single treatment for the control of a large variety of insects and mites. In the present series of compounds, the presence of this form of pesticidal activity is quite unexpected since the compounds having the identical structural formula except that Y is a hydrogen atom, hereinafter referred to as the precursor, do not exhibit appreciable insecticidal or miticidal activity. Indeed, tests performed using insect and mite pests readily controlled by the present compounds are not controlled by the precursor.

The products of the present invention can be conveniently prepared by the chlorination of a polyhalo-4,7-endomethylene-3a,4,7,7a-tetrahydrophthalide, previously denoted as the precursor. The precursor can be obtained by the oxidation and cyclization of the corresponding polyholo-2,3-dimethylol bicyclo-[2.2.1] - 5 - heptene. Riemschneider and Hilscher in 15b Z. Naturforsch. 809 (1960) describe this reaction for the hexachloro compound (1,4,5,6,7,7 - hexachloro-2,3 - dimethylol bicyclo-[2.2.1]-5-heptene) and it can be readily adapted for use with the various halo-substituted compounds corresponding thereto.

The diol compounds useful in the foregoing reaction are readily obtained by the Diels-Alder adduction of a polyhalocyclopentadiene and butene diol. This reaction can be carried out under standard Diels-Alder conditions using as the polyhalocyclopentadiene such materials as hexachlorocyclopentadiene, 1,2,3,4,5 - pentachlorocyclopentadiene, 1,2,3,4, - tetrachlorocyclopentadiene, hexabromocyclopentadiene, 1,2-dichloro-3,4,5,5 - tetrabromocyclopentadiene; 1,2,3,4-tetrabromo-5,5-dichlorocyclopentadiene; 1,2 - dibromo - 3,4 - dichlorocyclopentadiene; 1,2,3,4,5-pentabromocyclopentadiene and the like depending on the desired final product since the halogens of the polyhalocyclopentadiene reactant correspond to the X and Y substituents of the final products as represented by the foregoing structure.

Accordingly, the preparation of the present compounds by this procedure can be outlined as follows:

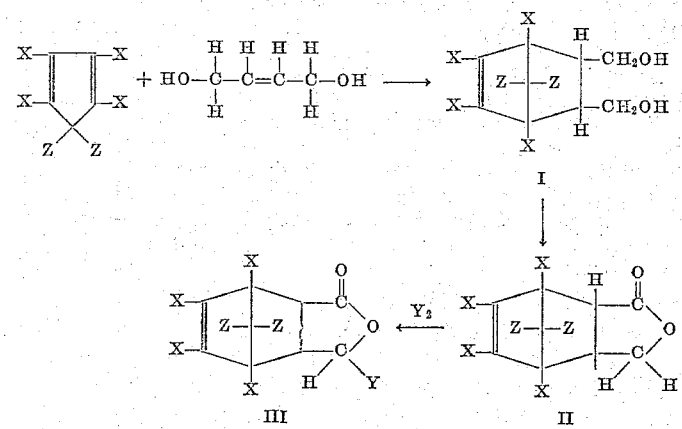

Since the diol intermediate identified above as Structure I has been often reported in the literature, its preparation will not be elaborated herein (see for example U.S. Patent 2,983,732 entitled Process for the Preparation of Organic Cyclic Sulfites).

From this patent it can be seen that the diol reactant can be varied by the selection of the polyhalocyclopentadiene used in the Diels-Alder adduction as follows:

| Polyhalocyclopentadiene | "Diol" |
|---|---|
| 1,2,3,4,5-pentachlorocyclopentadiene. | 1,4,5,6,7-pentachloro-2,3-dimethylol bicyclo [2.2.1]-5-heptene. |
| 1,2,3,4-tetrachlorocyclopentadiene. | 1,4,5,6-tetrachloro-2,3-dimethylol bicyclo [2.2.1]-5-heptene. |
| 1,2,3,4,5,5-hexabromocyclopentadiene. | 1,4,5,6,7,7-hexabromo-2,3-dimethylol bicyclo [2.2.1]-5-heptene. |
| 1,2-dichloro-3,4,5,5-tetrabromocyclopentadiene. | 1,4-dichloro-5,6,7,7-tetrabromo-2,3-dimethylol bicyclo [2.2.1]-5-heptene. |
| 1,2-dibromo-3,4-dichlorocyclopentadiene. | 1,4-dibromo-5,6-dichloro-2,3-dimethylol bicyclo [2.2.1]-5-heptene. |

The above is a partial list of some of the diol intermediates useful in this one procedure of manufacturing the present compounds. In this procedure, as previously indicated, the diol is cyclized as per the procedure of Riemschneider et al. to form a cyclized keto compound represented above as Structure II. This reaction can be performed using nitric acid as the cyclization-oxidation agent. While certain other mineral acids will cause the cyclization, they will not cause the necessary oxidation to form the keto grouping. This can be accomplished by a combination of reactants but since nitric acid in itself is quite satisfactory for this purpose such procedures are unnecessary. The following experiment illustrates the performance of this reaction.

EXAMPLE 1

*Preparation of 4,5,6,7,8,8-hexachloro-4,7-endomethylene-3a,4,7,7a-tetrahydrophthalide*

1,2,3,4,5,5-hexachloro-2,3-dimethylol bicyclo-[2.2.1]-5-heptene (250 grams; 0.6 mol) and concentrated (70%) nitric acid (1 liter) were placed in a 3-neck glass reaction flash equipped with stirrer, reflux condenser, thermometer, and heating mantle. The temperature of the reaction mixture was raised to 90° C. and maintained there for 4 hours with constant stirring. At that time the reaction mixture was cooled, poured onto crushed ice and the solid particles dissolved in ether. This ether solution was washed with cold water and dried over magnesium sulfate. After being filtered, the ether was stripped to yield a white solid product. This product after being crystallized from heptane had a melting point of 260–262° F. 182 grams of desired product were recovered representing a yield of 81% of theoretical.

As previously indicated the diol used in the above example can be replaced by other polyhalo-2,3-dimethylol bicyclo-[2.2.1]-5-heptenes selected such that the halogen substituents correspond with the desired "X" and "Z" substituents in the ultimate product as shown in the structure previously designated as III.

The final step in this method for the production of the present compounds involves the direct halogenation of the cyclized ketone, represented previously as Structure II so as to substitute one halogen atom into the 3-position of said ketone. This reaction can be accomplished by reaction with gaseous chlorine as described in the following experiment:

EXAMPLE 2

*Preparation of 3,4,5,6,7,8,8-heptachloro-4,7-endomethlyene-3a,4,7,7a-tetrahydrophthalide*

A solution of 2-keto-4,5,6,7,8,8-hexachloro-4,7-endomethylene-3a,4,7,7a-tetrahydrophthalan (100 grams; 0.28 mol) in carbon tetrachloride (300 ml.) was placed in a 3-neck glass reaction flask equipped with stirrer, thermometer, reflux condenser, heating mantle and externally equipped with a mercury lamp set so as to provide maximum illumination. The solution was heated to and maintained at 70° C. for 2 hours while gaseous chlorine was bubbled in at the rate of 25 liters per hour. A 50 ml. aliquot was taken after 60 minutes. It and the final reaction mixture were stripped of solvent and the recovered material triturated with pentane to yield the desired white solid product having a melting point of 110° C.

Elemental analysis for $C_9H_3Cl_7O_2$ was performed:

| | Percent C | Percent H | Percent Cl |
|---|---|---|---|
| Theoretical | 27.62 | 0.77 | 63.43 |
| Found | 27.89 | 0.76 | 63.03 |

In order to obtain by this procedure the other compounds within the scope of the present invention it is necessary to use in the chlorination reaction as a suitable phthalide reactant a 2-keto-polyhalo-4,7-endomethylene-3a,4,7,7a-tetrahydrophthalane having the halogens as desired in the ultimate product. Since these halogen atoms are not affected by the reaction, they will maintain the same positions as follows. Naturally bromine or chlorine can be used as halogenation reactants:

4,5,6,7,8,8-hexabromo - 4,7 - endomethylene-3a,4,7,7a-tetrahydrophthalide+$Cl_2$→4,5,6,7,8,8 - hexabromo - 3-chloro-3a,4,7,7a-tetrahydrophthalide.

4,5,6,7,8,8-hexachloro - 4,7 - endomethylene-3a,4,7,7a-tetrahydrophthalide+$Br_2$→4,5,6,7,8,8 - hexachloro - 3-bromo-3a,4,7,7a-tetrahydrophthalide.

4,5,6,7-tetrachloro-4,7-endomethylene - 3a,4,7,7a-tetrahydrophthalide+$Br_2$→4,5,6,7 - tetrachloro - 3-bromo-4,7-endomethylene-3a,4,7,7a-tetrahydrophthalide.

4,5,6,7,8-pentachloro - 4,7 - endomethylene-3a,4,7,7a-tetrahydrophthalide+$Br_2$→4,5,6,7,8 - pentachloro - 3-bromo-4,7-endomethylene-3a,4,7,7a-tetrahydrophthalide.

4,5,6,7,8-pentabromo - 4,7 - endomethylene-3a,4,7,7a-tetrahydrophthalide+$Cl_2$→4,5,6,7,8 - pentabromo - 3-chloro-4,7-endomethylene-3a,4,7,7a-tetrahydrophthalide.

4,5,6,7,8-pentabromo - 4,7 - endomethylene-3a,4,7,7a-tetrahydrophthalide+$Br_2$→3,4,5,6,7,8-hexabromo - 4,7-endomethylene-3a,4,7,7a-tetrahydrophthalide.

In order to prepare the compounds wherein the Y substituent of the present compounds is iodine or fluorine, it is desirable to use the corresponding chlorine or bromine compound as a precursor, replacing the chlorine or bromine atom present in the 3-position with fluorine or iodine as desired. This reaction is illustrated by the following:

3,4,5,6,7,8,8-heptachloro - 4,7 - endomethylene-3a,4,7,7a-tetrahydrophthalide+$NaI$→4,5,6,7,8,8-hexachloro - 3-iodo-4,7-endomethylene-3a,4,7,7a-tetrahydrophthalide.

3,4,5,6,7,8,8-heptachloro - 4,7 - endomethylene-3a,4,7,7a-tetrahydrophthalide+$KF$→4,5,6,7,8,8-hexachloro - 3-fluoro-4,7-endomethylene-3a,4,7,7a-tetrahydrophthalide.

3,4,5,6,7,8,8-heptabromo - 4,7 - endomethylene-3a,4,7,7a-tetrahydrophthalide+$NaI$→4,5,6,7,8,8-hexabromo - 3-iodo-4,7-endomethylene-3a,4,7,7a-tetrahydrophthalide.

3,4,5,6,7,8,8-heptabromo - 4,7 - endomethylene-3a,4,7,7a-tetrahydrophthalide+$KF$→4,5,6,7,8,8-hexabromo - 3-fluoro-4,7-endomethylene-3a,4,7,7a-tetrahydrophthalide.

In order to ascertain the miticidal and insecticidal activity of the present compounds a series of tests was performed using house flies, southern armyworm, Mexican bean beetle and spider mites as the test specimens as follows:

Fifty adult house flies of the Chemical Specialties Manufacturer's Association strain were place in a 2 inch x 5 inch diameter stainless steel cage faced on top and bottom with 14 mesh screen. A solution of 3,4,5,6,7,8,8-heptachloro - 4,7 - endomethylene-3a,4,7,7a-tetrahydrophthalide in 0.5 ml. of benzene was diluted with distilled water to a concentration of 0.35% and sprayed onto the caged houseflies. The percent knockdown of the flies as measured 24 hours after the spraying was found to be 100%.

Next Lima bean leaves were sprayed on their dorsal and ventral surfaces with the 0.35% solution of 3,4,5,6,7,8,8-heptachloro - 4,7 - endomethylene - 3a,4,7,7a-tetrahydrophthalide. These leaves were then offered to ten larvae of the southern armyworm (late third instar) for a forty-eight hour feeding period. At that time the percent mortality of the southern armyworms was found to be 100.

Then the above mentioned Lima bean leaves which had been sprayed with the solution of 3,4,5,6,7,8,8-heptachloro-4,7-endomethylene - 3a,4,7,7a-tetrahydrophthalide were offered to ten larvae of the Mexican bean beetle (late second instar) for a forty-eight hour feeding period. At that time the percent mortality of the beetles was found to be 80.

Finally Lima bean plants were infested with adult strawberry spider mites, *Tetranychus atlanticus*. The infested plants were dipped into the 0.35 solution of 3,4,5,6,7,8,8-heptachloro - 4,7 - endomethylene - 3a,4,7,7a-tetrahydrophthalide and held for five days. The percent mortality was determined at the end of the five day period to be 75.

It is clear from the foregoing tests that the compounds of the present invention have broad spectrum of insecticidal and miticidal activity. The compound used in this testing procedure is representative of the present compounds. Its activity against such a wide variety of noxious species demonstrates the unusual utility of the present compounds.

For practical use as insecticides, the compounds of this invention are generally incorporated into insecticidal compositions which comprise an inert carrier and an insecticidally toxic amount of such a compound. Such insecticidal compositions, which are usually known in the art as formulations, enable the active compound to be applied conveniently to the site of the insect infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 3

*Preparation of a dust*

| | Weight percent |
|---|---|
| Product of Example 2 | 10 |
| Powdered talc | 90 |

The above ingredients are mixed in a mechanical grinder-blender and are ground until a homogeneous, free-flowing dust of the desired particle size is obtained. This dust is suitable for direct application to the site of the insect infestation.

The insecticides of this invention can be applied in any manner recognized by the art. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 5 to about 75 percent by weight of the active compound. The compositions can also comprise such additional substances as other pesticides, spreaders, adhesives, stickers, fertilizers, activators, synergists, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the wooly apple aphid, the Japanese beetle, and the corn rootworm.

Mites and ticks are not true insects. Many enonomically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

We claim:
1.

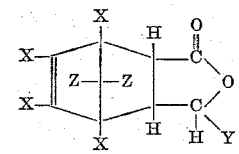

wherein each X is independently selected from the group consisting of bromine and chlorine, each Z is independently selected from the group consisting of chlorine, bromine and hydrogen; and Y is a halogen atom.

2. 3,4,5,6,7,8,8-heptachloro - 4,7 - endomethylene-3a, 4,7,7a-tetrahydrophthalide.

3. 3,4,5,6,7,8-hexachloro - 4,7 - endomethylene-3a,4,7, 7a-tetrahydrophthalide.

4. 3,4,5,6,7-pentachloro - 4,7 - endomethylene-3a,4,7, 7a-tetrahydrophthalide.

5. 4,5,6,7,8,8 - hexachloro-3-bromo - 4,7 - endomethylene-3a,4,7,7a-tetrahydrophthalide.

6. 3,4,5,6,7,8,8 - heptabromo - 4,7 - endomethylene-3a, 4,7,7a-tetrahydrophthalide.

7. 4,5,6,7,8,8 - hexabromo-3-chloro - 4,7 - endomethylene-3a,4,7,7a-tetrahydrophthalide.

8. 4,5,6,7,8,8-hexachloro-3-iodo - 4,7 - endomethylene-3a,4,7,7a-tetrahydrophthalide.

9. 4,5,6,7,8,8 - hexachloro-3-fluoro - 4,7 - endomethylene-3a,4,7,7a-tetrahydrophthalide.

(References on following page)

References Cited by the Examiner

UNITED STATES PATENTS

| | | | |
|---|---|---|---|
| 2,598,562 | 5/52 | Kleiman | 260—343.3 |
| 2,654,689 | 10/53 | Ligett et al. | 167—33 |
| 2,657,169 | 10/53 | Ligett et al. | 167—33 |
| 2,945,865 | 7/60 | Wheeler et al. | 260—343.3 |
| 2,997,481 | 8/61 | Wheeler et al. | 260—343.3 |

FOREIGN PATENTS 1,117,568  11/61  Germany.

OTHER REFERENCES

Frear et al.: Jour. Economic Entomology, vol. 40 (1947), pages 736–741.

Lawlor: Ind. and Eng. Chem., vol. 39 (1947), pages 1420 and 1422.

IRVING MARCUS, *Primary Examiner.*

NICHOLAS S. RIZZO, WALTER A. MODANCE,
*Examiners.*